Nov. 9, 1971    E. HUNDHAUSEN    3,618,304
LAWN MOWER

Filed July 7, 1970    2 Sheets-Sheet 1

Inventor:
ECKHARD HUNDHAUSEN by
Ostrolenk, Faber, Gerb & Soffen
ATTORNEYS

Inventor:
ECKHARD HUNDHAUSEN
by
Ostrolenk, Faber, Gerb & Soffen
ATTORNEYS

United States Patent Office 3,618,304
Patented Nov. 9, 1971

3,618,304
LAWN MOWER
Eckhard Hundhausen, Betzdorf (Sieg), Germany, assignor to Wolf-Gerate GmbH, Betzdorf (Sieg), Germany
Filed July 7, 1970, Ser. No. 52,957
Claims priority, application Germany, July 15, 1969,
P 19 36 010.2
Int. Cl. A01d *35/26*
U.S. Cl. 56—16.9                                              9 Claims

ABSTRACT OF THE DISCLOSURE

The specification describes a lawn mower with co-axial blades counter rotating about a vertical axis and driven respectively by the stator and rotor of an electric motor. A hollow shaft emanating from the stator is fixed to one blade while also functioning to circumscribe a second shaft emanating from the rotor, which is fixed to the second blade.

BACKGROUND OF INVENTION

(1) Field to which invention relates

The present invention relates to lawn mowers and more particularly to lawn mowers comprising a chassis, an electric motor, two superposed knives arranged to be rotated in relation to each other, the knives preferably having the form of discs, and means connecting the electric motor with the knives.

SUMMARY OF INVENTION

The invention consists in a lown mower comprising a chassis, an electric motor, knives arranged to be rotated in relation to each other by the electric motor, means rotatably carrying a stator of the electric motor on the chassis, and means connecting the stator with one knife and a rotor of the electric motor with the other knife.

The stator of the motor can be directly mounted in the chassis that is to say the means of a bearing carrying the stator, or the arrangement can be such that the stator is simply free to rotate on the rotor shaft of the motor.

In accordance with a preferred form of the invention there is the feature that the upper knife, which is in the form of a disc is carried on a hollow shaft in which the drive shaft of the motor, which carries the other disc, runs.

The knives are preferably provided with teeth, the teeth of the lower knife being longer than the teeth of the upper knife. The knives can be arranged to rub against each other so that their teeth are sharpened.

A rolling element bearing can be provided between the knives.

In accordance with a preferred embodiment of the invention the teeth on the knives are directed in opposite directions and their cutting edges are provided with secondary teeth.

LIST OF SEVERAL VIEWS OF DRAWINGS

Embodiments of the invention are now described with reference to the drawings.

DESCRIPTION OF PREFERRED EMBODIMENTS

Figure 1:
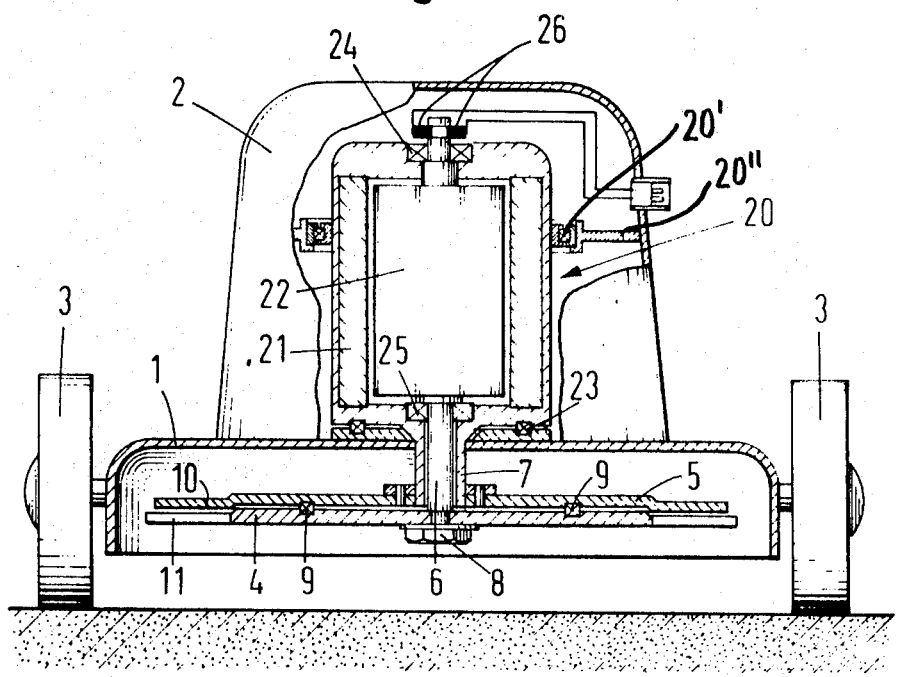
FIG. 1 is a diagrammatic section through a lawn mower constructed in accordance with the invention.

As shown in FIG. 1 an electric motor 20, which is covered by a hub 2 is mounted on a chassis 1. As will be described presently two knives 4 and 5 are arranged on the underside of the chassis 1 and are caused to rotate in opposite directions. The reference numeral 3 denotes the wheels of the chassis which can, as in the present case, be arranged to be pushed by hand.

In order to achieve opposite rotation of the knives 4 and 5, the rotor 22 and the stator 21 of the electric motor 20 is journalled in the chassis 1 of the mower. For this purpose use is made of an anti-friction bearing 20' mounted in a flange 20'' in the housing 2. Current is supplied to the motor via slip rings generally denoted by reference numeral 26 and cooperating bushes. The reason for the opposite rotation of the rotor and stator lies in the physical law that in coupled systems (the coupling in the present system is constituted by the magnetic field of the motor) action is equal to reaction. If the rotor 22 and the stator 21 together with the knives 4 and 5 connected with them in such a manner that they have equal moments of inertia, the knives 4 and 5 rotate at the same speed on the assumption that the friction is equal, but in opposite directions. In the case of the use of a six poled motor the speed of rotation is 1000 r.p.m. instead of the more conventional 3000 r.p.m., this being advantageous for the cutting system with the knives.

In the embodiment shown the stator or motor housing 21 is journalled directly in the chassis 1. Thrust bearing means 23 art indicated diagrammatically at 23. It is, however, to be pointed out that the motor housing or stator 21 can be provided with further bearings to those shown. The rotor 22 is rotatably carried in the stator 21 by bearings 24 and 25. A shaft 6 is connected with the rotor 22 and that its lower end carries the knife 4. On the housing or stator 21 there is a hollow shaft 7 surrounding the shaft 6 and at its lower end carries the upper knife 5.

Figure 2:
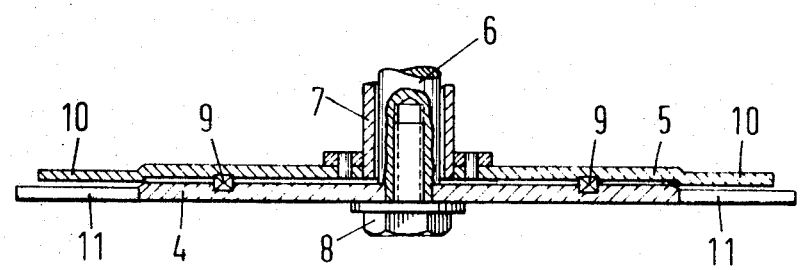
FIG. 2 is a section on the line II—II in FIG. 3.
Figure 3:
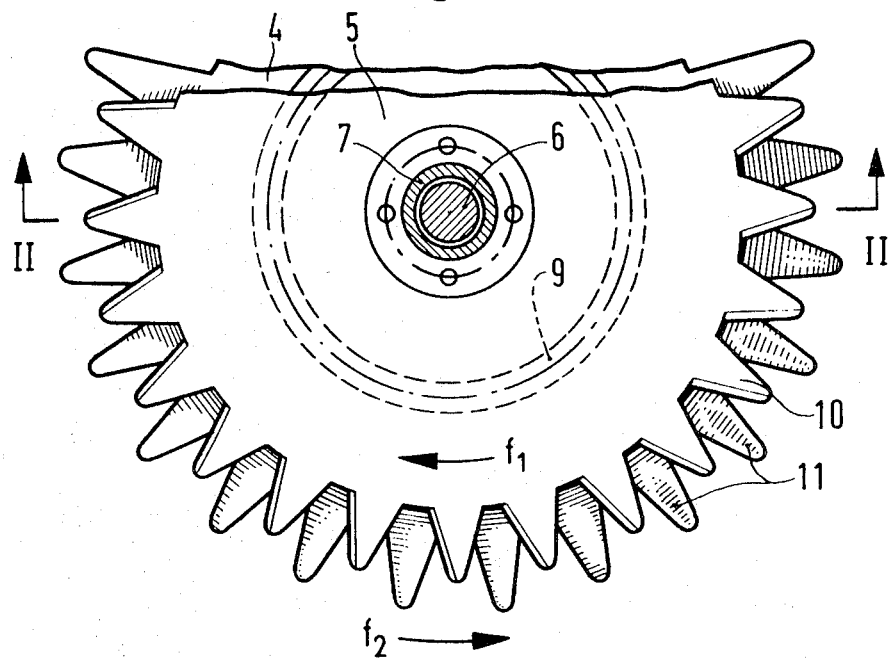
FIG. 3 is a plan view of the two driven knives rotating in opposite directions.

In the case of the embodiment of FIGS. 2 and 3 the knives are driven in opposite directions as indicated by the arrows f1 and f2. In FIG. 3 reference numeral 8 denotes a screw which attaches the lower knife 4 to the shaft 6. Between the two knives 4 and 5 there is a rubbing action, that is to say the teeth 10 and 11 on the knives press against each other in a resilient manner to provide a sharpening action. By a suitable choice of the moment of inertia of the rotor and of the stator together with their associated knives it is possible to achieve the same or different speeds of rotation of the knives 4 and 5. In the case of the same speed of rotation there is a cutting action which is equally effective over the whole cutting width.

The knife teeth 11 provided on the lower disc or knife 4 are somewhat longer than the knife teeth 10 of the upper disc or knife 5. All knife teeth are preferably somewhat rounded at their tips.

Figure 4:
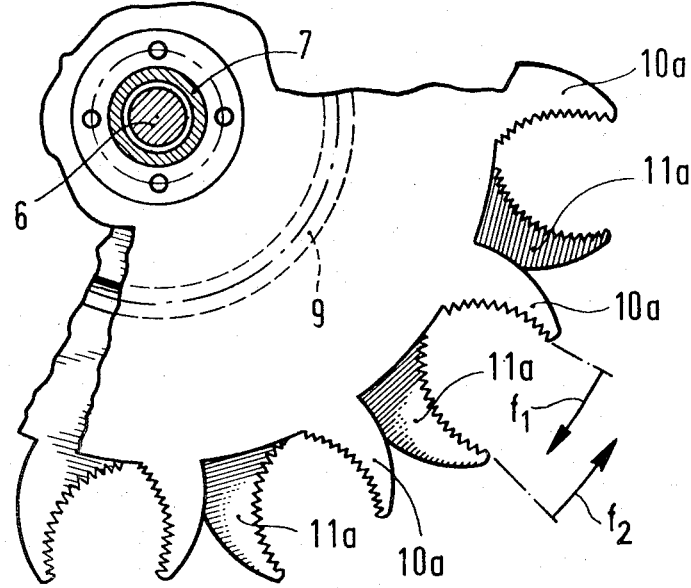
FIG. 4 shows a further embodiment of the invention with two oppositely rotating knives whose teeth are claw-shaped and provided with secondary teeth on their cutting edges.

In the case of the embodiment of FIG. 4 the knife teeth 10a of the upper knife or disc and the knife 11a of the lower disc, which rotates in the opposite direction, are provided with secondary teeth along their cutting edges. The teeth are in the form of oppositely directed claws.

What I claim is:

1. A lawn mower comprising a chassis, an electric motor, knives arranged to be rotated in relation to each other by the electric motor, means rotatably carrying a stator of the electric motor on the chassis, and means connecting the stator with one knife and a rotor of the electric motor with the other knife.

2. A lawn mower in accordance with claim 1 in which at least one knife is in the form of a disc having teeth on its periphery.

3. A lawn mower in accordance with claim 1 in which the stator of the motor is mounted in a rotary manner on the chassis.

4. A lawn mower in accordance with claim 1 comprising a hollow shaft carrying the upper knife and a shaft portion connecting the lower knife with the rotor of the motor.

5. A lawn mower in accordance with claim 1 in which the knives carry peripheral teeth, the peripheral teeth of the lower knife extending for a greater radial distance than those of the upper knife.

6. A lawn mower in accordance with claim 1 in which the knives are arranged to engage each other peripherally.

7. A lawn mower in accordance with claim 1 comprising rolling element bearing means between the knives.

8. A lawn mower in accordance with claim 1 in which the knives carry claw-shaped teeth, the teeth on the one knife being directed in the opposite direction to those of the other.

9. A lawn mower in accordance with claim 1 in which the teeth are provided with secondary teeth on their cutting edges.

References Cited
UNITED STATES PATENTS

| | | | |
|---|---|---|---|
| 1,275,851 | 8/1918 | Comfort | 56—255 |
| 2,598,091 | 5/1952 | Ahlgrim | 56—295 |

LOUIS G. MANCENE, Primary Examiner

J. N. ESKOVITZ, Assistant Examiner

U.S. Cl. X.R.

56—255, 295